(12) United States Patent
Criel et al.

(10) Patent No.: US 10,823,333 B2
(45) Date of Patent: Nov. 3, 2020

(54) PRESSURE VESSEL SYSTEM

(71) Applicant: Plastic Omnium Advanced Innovation and Research, Brussels (BE)

(72) Inventors: Bjorn Criel, Sint-Martens-Lennik (BE); Francois Dougnier, Hever (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 16/071,939

(22) PCT Filed: Jan. 25, 2017

(86) PCT No.: PCT/EP2017/051503
§ 371 (c)(1),
(2) Date: Jul. 23, 2018

(87) PCT Pub. No.: WO2017/129597
PCT Pub. Date: Aug. 3, 2017

(65) Prior Publication Data
US 2019/0024845 A1    Jan. 24, 2019

(30) Foreign Application Priority Data
Jan. 25, 2016   (EP) .................................. 16305064

(51) Int. Cl.
*F17C 1/16*   (2006.01)
*F17C 13/02*   (2006.01)
*F17C 1/00*   (2006.01)

(52) U.S. Cl.
CPC .................. *F17C 1/16* (2013.01); *F17C 1/00* (2013.01); *F17C 13/02* (2013.01);
(Continued)

(58) Field of Classification Search
CPC .... F17C 1/16; F17C 1/00; F17C 13/02; F17C 2250/0439; F17C 2250/0452;
(Continued)

(56) References Cited

U.S. PATENT DOCUMENTS 2,979,070 A * 4/1961 Payne ....................... F15B 1/08
137/192
3,577,696 A * 5/1971 Bock ......................... F17C 5/06
53/403

(Continued)

FOREIGN PATENT DOCUMENTS

CN        103717960 A    4/2014
DE   10 2013 219 968 A1   4/2015
(Continued)

OTHER PUBLICATIONS

International Search Report dated Mar. 22, 2017 in PCT/EP2017/051503 filed Jan. 25, 2017.

*Primary Examiner* — Kareen K Thomas
(74) *Attorney, Agent, or Firm* — Oblon, McClelland, Maier & Neustadt, L.L.P.

(57) ABSTRACT

The invention relates to a pressure vessel system comprising a pressure vessel for storing a gas under pressure, at a potential leakage interface of the pressure vessel, one or more gas sensitive parts configured to undergo a modification when the gas passes along the potential leakage interface; said leakage interface being an interface within the pressure vessel; and one or more detection modules configured to detect a modification of the one or more gas sensitive parts. The invention also relates to a connection assembly comprising a first connection part and a second connection part, said first and second connection part being configured to realize a gas tight connection; one or more gas sensitive parts arranged at a connection interface between the first connection part and the second connection part, and one or (Continued)

more detection modules configured to detect a modification of the one or more gas sensitive parts.

20 Claims, 9 Drawing Sheets

(52) U.S. Cl.
CPC ............ *F17C 2201/0109* (2013.01); *F17C 2203/0604* (2013.01); *F17C 2203/066* (2013.01); *F17C 2203/0663* (2013.01); *F17C 2205/0305* (2013.01); *F17C 2205/0326* (2013.01); *F17C 2205/0332* (2013.01); *F17C 2209/2127* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/0161* (2013.01); *F17C 2223/033* (2013.01); *F17C 2223/035* (2013.01); *F17C 2223/036* (2013.01); *F17C 2250/032* (2013.01); *F17C 2250/034* (2013.01); *F17C 2250/036* (2013.01); *F17C 2250/04* (2013.01); *F17C 2250/0439* (2013.01); *F17C 2250/0452* (2013.01); *F17C 2260/038* (2013.01); *F17C 2270/0168* (2013.01); *Y02E 60/32* (2013.01)

(58) Field of Classification Search
CPC .......... F17C 2260/038; F17C 2250/036; F17C 2203/0663; F17C 2201/0109; F17C 2221/033; F17C 2221/035; F17C 2205/0326; F17C 2270/0168; F17C 2250/04; F17C 2250/034; F17C 2250/032; F17C 2223/036; F17C 2223/035; F17C 2223/033; F17C 2223/0161; F17C 2223/0153; F17C 2223/0123; F17C 2221/012; F17C 2209/2127; F17C 2205/0332; F17C 2205/0305; F17C 2203/066; F17C 2203/0604; Y02E 60/321

USPC ... 220/586, 588, 589, 590, 591, 560.04, 562
See application file for complete search history.

(56) References Cited

U.S. PATENT DOCUMENTS

| | | | | |
|---|---|---|---|---|
| 3,815,773 | A | * | 6/1974 | Duvall ................ F16J 12/00 220/590 |
| 3,843,010 | A | * | 10/1974 | Morse ................ F17C 1/06 220/590 |
| 4,164,242 | A | * | 8/1979 | Sandau ................ F15B 1/18 138/131 |
| 4,234,014 | A | * | 11/1980 | Knight ................ F16N 7/34 137/557 |
| 4,320,654 | A | | 3/1982 | Collins |
| 4,386,627 | A | * | 6/1983 | Lachaux ................ F17C 7/00 137/514.3 |
| 4,473,171 | A | * | 9/1984 | Nunlist ................ B01J 3/002 220/565 |
| 4,491,247 | A | * | 1/1985 | Nitchman ................ B65D 77/06 220/586 |
| 4,765,507 | A | * | 8/1988 | Yavorsky ................ F17C 1/12 220/590 |
| 2009/0110990 | A1 | | 4/2009 | Izutani et al. |
| 2012/0098666 | A1 | * | 4/2012 | Bavishi ................ F23K 5/007 340/626 |
| 2013/0189593 | A1 | | 7/2013 | Izutani et al. |

FOREIGN PATENT DOCUMENTS

| | | |
|---|---|---|
| EP | 1 935 844 A1 | 6/2008 |
| NO | 136504 B | 6/1977 |
| WO | WO 2013/083169 A1 | 6/2013 |
| WO | WO 2013/083652 A2 | 6/2013 |

\* cited by examiner

PRESSURE VESSEL SYSTEM

FIELD OF INVENTION

The field of the invention relates to pressure vessel systems, in particular pressure vessel systems for use in a vehicle. Particular embodiments relate to pressure vessels for storing hydrogen gas, liquid petroleum gas (LPG), compressed natural gas (CNG), or ammonia, and to connection assemblies for use in pressure vessel systems.

BACKGROUND

When a fluid is stored in a container, it is desirable to prevent leakage of the stored fluid from the container as such leakage results in loss of the stored fluid. In addition, leakage of the fluid can also be dangerous, for example, if the leak allows a toxic gas to be released into the atmosphere.

Also, if a flammable gas is stored in a container, the leakage of this flammable gas from the container could lead to an explosion which may cause damage.

Therefore, it is known to provide fluid storage containers with a means for detecting loss of the fluid from the container.

For example, German patent application DE102013219968 describes a gas-containing inner container that is surrounded by a gas-tight outer container. Between the outer container and the inner container there is provided an intermediate space for receiving any gas which has escaped from the inner container, and in this intermediate space there is at least one gas sensor for detecting the leaked gas.

In alternative systems, an odorant may be added to a gas stored in a container. In such systems, the gas leakage is then detected by the smell of the escaped gas. For example, natural gas is odourless and highly flammable. In order to enable leaks to be detected rapidly, an odorant such as mercaptan is added to natural gas so that any gas leaks can be detected by smell.

Similarly, European patent application EP1935844 describes a hydrogen supply apparatus in which an odorant is mixed with hydrogen gas. This added odorant can then be used to detect leakage of the hydrogen gas. In EP1935844, the apparatus comprises a gas storage means for storing hydrogen gas, and an odorant-addition means for adding an odorant to hydrogen gas fed from the gas storage means.

In other known systems, the leak of gas from a tank can be detected by measuring the pressure and temperature within the tank. For example, in such systems, the pressure and temperature may be measured when the gas is first added to the container and then after the gas has been stored for a period of time. If the temperature of the gas within the container is the same for both readings but the pressure has dropped, then it can be concluded that there is a gas leakage.

However, all of these known systems for detecting gas leakages have disadvantages.

For example, using a double-walled tank such as that described in DE102013219968 increases both the cost and the weight of the system.

Similarly, if you have a system in which an odorant is added to the gas, then the system needs to also comprise a means for storing and adding the odorant and this also may increase the cost and the weight of the system. Furthermore, with the known odorant systems you need a user positioned close to the system at the time of the leak so that the smell can be detected.

Also, systems which use pressure and temperature measurements to determine if there has been a gas leak may only alert someone to the presence of this leak after a large proportion of the gas has escaped.

SUMMARY

Embodiments of the invention aim to provide a pressure vessel system for storing a gas which comprises a means for detecting a gas leak from the pressure vessel that does not have one or more of the disadvantages of the leak detection systems known from the prior art.

According to a first aspect of the invention, there is provided a pressure vessel system comprising a pressure vessel, one or more gas sensitive parts, and one or more detection modules. The pressure vessel is configured to store a gas under pressure. The one or more gas sensitive parts are arranged at a potential leakage interface of the pressure vessel, and are configured to undergo a modification when the gas passes along the potential leakage interface. These gas sensitive parts are, for example, attached to the potential leakage interface. By "attached", we mean that the gas sensitive part could be connected to the potential interface, by being mounted fixed or movable. The leakage interface is an interface which is integrated within the pressure vessel. For example, any interface of the pressure vessel could be considered as a leakage interface or as a potential leakage interface, since gas could escape from the interface to the outside of the vessel pressure. The one or more detection modules are configured to detect a modification of the one or more of the gas sensitive parts. In other words, the pressure vessel system according to the invention comprises:

a pressure vessel for storing a gas under pressure,
at a potential leakage interface of the pressure vessel, one or more gas sensitive parts configured to undergo a modification when the gas passes along the potential leakage interface; said leakage interface being an interface within the pressure vessel; and
one or more detection modules configured to detect a modification of the one or more gas sensitive parts.

In one embodiment, the one or more detection modules are distinct from the one or more of gas sensitive parts. Indeed, in this embodiment, the one or more detection modules and the one or more gas sensitive parts are related to a two-part process: at least a gas sensitive part merely is able to undergo a modification because of the presence of gas. Then, at least a detection module merely is able to detect a modification about the at least sensitive part. In other terms, in this embodiment, the one or more detection modules detect the modification undergone by the one or more gas sensitive parts when the gas passes along the interface.

In another embodiment, the one or more detection module and the one or more gas sensitive parts could be a single component. In this embodiment, this single component is itself able to detect gas when the gas passes along the interface.

Embodiments of the invention have the advantage that leakage of a pressure vessel may be detected in an improved reliable manner, allowing for a compact integration of the one or more gas sensitive parts in any potential leakage interfaces without any significant weight increase of the pressure vessel system. In preferred embodiments, the integration may be such that the gas sensitive parts are integrated as close as possible to the potential leak in order to result in a fast detection of a leak.

In the context of the present invention, the term "leakage interface" is an interface, path or passage which is present and formed within the pressure vessel and which is a potential route along which gas may escape from the interior of the vessel in case of leakage. The one or more potential leakage interfaces are typically inherent to the construction of the pressure vessel. This means that such a potential leakage interface generally results from the manufacturing and/or the assembly of the pressure vessel. In practice, a pressure vessel will have a number of paths that are prone to leakage, such as an interface between two layers of a pressure vessel body or a connection interface. Normally such interfaces do not have leakage problems after the manufacturing and/or assembly, but they may start leaking over time, e.g. after 5 years or after 10 years or after 15 years, due to aging effects, extreme temperature effects, vibrations, material degradation, etc. It is useful when this leaking which may appear over time can be detected as in embodiments of the present invention. When leakage is detected, it may then be determined that certain parts, e.g. a seal, needs to be changed, or in some cases it may be determined that the full pressure system should be replaced.

In the context of the present invention, the term "pressure vessel" refers to a vessel that is capable of withstanding an internal pressure of at least 2 bar, preferably at least 3 bar. The pressure vessel comprises a pressure vessel body, as well as any components integrated in the pressure vessel body such as functional parts mounted in an opening of the pressure vessel body, see further. The pressure vessel body may be a one layer body or a multilayer body.

In an exemplary embodiment, the leakage interface is any one of the following: an interface between two layers of a pressure vessel body of the pressure vessel which layers are in contact with each other, a connection interface between two integrated parts of the pressure vessel, a connection interface between an integrated part of the pressure vessel and a layer of the pressure vessel body. When referring to an integrated part of a pressure vessel, there is meant a part which is in contact with the pressure vessel body or which is mounted in the pressure vessel body.

In one embodiment, the pressure vessel comprises a pressure vessel body and a functional part which is provided in an opening of the pressure vessel body, wherein a seal is arranged between an edge of the opening and the functional part, and wherein at least one of the one or more gas sensitive parts is provided downstream of the seal, with reference to a flow of gas through the opening, in other terms between the functional part and the opening,. The vessel body is able to contain gas upstream of the opening. The functional part may be e.g. any one of the following: an adaptor part, a fitting part, a valve part, an outlet part, a closed part, a thermal pressure relief valve, a pressure sensor, a temperature sensor, an over-pressure relief valve, etc.

In some embodiments, the pressure vessel body may be an elongate substantially cylindrical body with two rounded end parts and the functional part may be arranged in an opening in one of the end parts.

In some embodiments of the pressure vessel system, the opening is delimited by a substantially cylindrical wall part of the pressure vessel and the functional part comprises a corresponding substantially cylindrical portion inserted in the opening. The at least one of the one or more gas sensitive parts may be arranged at the interface between the substantially cylindrical portion of the functional part and an inner side of the substantially cylindrical wall part.

In an exemplary embodiment, the substantially cylindrical portion of the functional part is provided with a circular groove in which the seal is arranged.

In an exemplary embodiment, the substantially cylindrical portion is a portion of a boss adapter inserted at least partly in the opening. The boss adapter may comprise a first substantially cylindrical portion, and a second substantially cylindrical portion, said first portion being inserted in the opening and said second portion extending outwardly out of the opening.

In some embodiments, the substantially cylindrical wall part protrudes outwardly, and a boss may be arranged around the substantially cylindrical wall part delimiting the opening. In such embodiments, the opening may be at least partially delimited by the internal cylindrical wall of the boss. This boss may provide a surface that can be engaged by the functional part. At least one of the one or more gas sensitive parts may be arranged at an interface of the boss. In other words, the opening is delimited by a substantially cylindrical wall part of the pressure vessel which protrudes outwardly, wherein a boss is arranged around the substantially cylindrical wall part delimiting the opening, and wherein at least one of the one or more gas sensitive parts is arranged at an interface of the boss.

In embodiments of a system comprising a functional part comprising a corresponding substantially cylindrical portion inserted in the opening, the substantially cylindrical portion may be a portion of a boss adapter inserted at least partly in the opening.

For example, the functional part may be formed at least partially from a cylindrical boss adaptor configured to engage with the internal walls of the boss. In some embodiments, the boss adaptor may screw into the boss.

In embodiments with a functional part comprising a corresponding substantially cylindrical portion, at least one of the one or more gas sensitive parts may be arranged, e.g. by overmoulding or coating, on this substantially cylindrical portion. Alternatively or additionally, the substantially cylindrical portion may be provided with a circular groove in which the seal is arranged. In some embodiments, the substantially cylindrical portion comprises metal. In other embodiments, at least one of the one or more gas sensitive parts may be attached to the seal or integrated in the seal. In yet other embodiments at least one of the one or more gas sensitive parts may be attached to the functional part, or integrated in the functional part.

In embodiments of the pressure vessel system comprising a boss adapter, this boss adapter may comprise a first substantially cylindrical portion having a first diameter, and a second substantially cylindrical portion having a second diameter larger than the first diameter, said first portion being inserted in the opening of the pressure vessel and said second portion extending outwardly out of the opening.

In embodiments of the pressure vessel system, the pressure vessel may comprise a liner, and the substantially cylindrical wall part may be an integral part of the liner.

In embodiments where the pressure vessel comprises a liner and a boss, the substantially cylindrical wall part delimiting the opening may be overmoulded on the boss and welded to the liner around an opening in the liner.

In some embodiments, the boss may be arranged around the substantially cylindrical wall part delimiting the opening, and around a part of the second portion of a boss adaptor inserted into the opening.

The functional part may comprise a valve arranged in the substantially cylindrical portion, and at least one of the one or more gas sensitive parts may be arranged between the valve and the substantially cylindrical portion. This valve may include e.g. an overpressure relief valve, a thermal relief valve, a normally closed electro-valve managing e.g. hydrogen supply to a fuel cell or gas supply to an engine.

In embodiments of the invention, the pressure vessel may be configured to store any one of the following: liquid petroleum gas (LPG), hydrogen, compressed natural gas (CNG), ammonia, typically aqua ammonia and wherein the pressure vessel is configured to withstand a pressure above 0.2 MPa (2 bars).

In embodiments, one or more of the gas sensitive parts may be positioned so that it is exposed to air. For example, the gas sensitive part may be positioned next to a groove which is configured to communicate with the ambient air. Such embodiments may be advantageous when the detection module operates better when the gas sensitive part is exposed to air.

The pressure vessel may be configured to store a gas at a pressure above 0.3 MPa (3 bar) in some embodiments of the invention.

If the pressure vessel is configured to store liquid petroleum gas (LPG), then the pressure vessel may be configured to store this liquid petroleum gas at a pressure of approximately 0.5 MPa to 1.5 MPa (5 to 15 bar). For pressure vessels configured to store hydrogen gas, the pressure vessel may store this gas at a pressure of approximately 70 MPa (700 bar), or 35 MPa (old standard 350 bar). If the pressure vessel is for storing compressed natural gas (CNG), the pressure vessel may be configured to store the gas at approximately 20 MPa (200 bar). If the pressure vessel is for storing ammonia, typically aqua ammonia, the pressure vessel may be configured to store the ammonia at a pressure from 0.1 MPa to 2 MPa.

The pressure vessel may comprise a liner and a reinforcement layer arranged around the liner in some embodiments of the invention.

In such embodiments, the liner may be made, e.g. by blow moulding or injection moulding, from a thermoplastic material. The liner may be composed of a mono-material based on e.g. HDPE, PA, PPA, or any other suitable thermoplastic material. Alternatively, the liner may be made out of a coextruded structure, e.g. a coextruded layer including a layer with very low hydrogen permeability.

The reinforcement layer may be formed from a composite material. The reinforcement layer may comprise reinforcement fibres, e.g. carbon, glass, aramid, etc., embedded in a thermoset or thermoplastic matrix. The reinforcement layer may be obtained by a filament winding process, a braiding process, an automatic tape placement process, a laser assisted tape placement process or any alternative process.

In yet another embodiment the pressure vessel does not include a liner and the gas containment function may be realized by the reinforcement layer. A seal may then be included in the reinforcement layer and/or on the boss adapter by a finishing or assembly operation.

In some embodiments, the liner may comprise an outwardly extending cylindrical wall part delimiting an opening, wherein a boss is arranged around the cylindrical wall part, said boss being partially covered by the reinforcement layer.

In embodiments of the pressure vessel system, at least one of the one or more gas sensitive parts may be arranged between the boss and the reinforcement layer. Such an embodiment will allow to detect leakage occurring due to leakage of the liner, wherein the leakage interface extends along an interface between the liner/boss and the reinforcement layer.

In a preferred embodiment, the liner may comprise an outwardly extending cylindrical wall part delimiting an opening, wherein a boss may be arranged around the cylindrical wall part, said boss being partially covered by the reinforcement layer, wherein at least one of the one or more gas sensitive parts may be arranged between the boss and the reinforcement layer.

In some embodiments, the liner may comprise a substantially cylindrical wall part protruding inwardly towards the interior of the pressure vessel, wherein the boss adapter comprises a first substantially cylindrical portion, and a second substantially cylindrical portion, said first portion being inserted in the opening and said second portion extending outwardly out of the opening; and wherein the reinforcement layer covers at least partly the second substantially cylindrical portion. In such an embodiment, the boss adaptor also functions as the boss. In such an embodiment, at least one of the one or more gas sensitive parts may be arranged between the second substantially cylindrical portion and the reinforcement layer and/or between the inwardly protruding substantially cylindrical wall part of the liner and the boss adaptor, downstream of a seal between the inwardly protruding substantially cylindrical wall part of the liner and the boss adaptor.

In some embodiments, the liner may comprise a substantially cylindrical wall part protruding inwardly towards the interior of the pressure vessel, wherein the boss adapter comprises a first substantially cylindrical portion, and a second substantially cylindrical portion, said first portion being inserted in the opening and said second portion extending outwardly out of the opening; and wherein the reinforcement layer covers at least partly the second substantially cylindrical portion and wherein at least one of the one or more gas sensitive parts is arranged between the second substantially cylindrical portion and the reinforcement layer.

In some embodiments, at least one of the one or more gas sensitive parts comprises any one of the following:
  carbon nanotubes,
  carbon black,
  polymeric material containing carbon nanotubes or carbon black,
  a nanotube gel (for example, a dispersion of carbon nanotubes in a tin oxide matrix prepared using the sol-gel process)
  a super-absorbent gel,
  a polymerized gel with ionic liquid as solvent (such as that described in the paper "Development of micro hydrogen gas sensor utilizing polymerized gel with ionic liquid as solvent" by T. Yamauchi et al published in ECS Transactions, 2012, vol. 50, N°12, pp 231-236),
  a catalytic bead "pellistor",
  one or more metal selected from rhodium, palladium, platinum, uranium, lanthanide, and the rare earth materials.

In some embodiments of the pressure vessel system, it is preferred to form one or more of the gas sensitive parts from palladium. For example, the palladium can be put as a coating on the surface of part of the system.

At least one of the one or more detection modules may be configured to measure any one or more of the following: an electrical property, a thermal property, a chemical property, an optical property.

In some embodiments, the detection module and/or the one or more gas sensitive materials may comprise any one of the following:
  a thermal conductivity detector,
  a palladium Field effect sensor,
  a palladium based resistor, a palladium coated fibre optic sensor,
a palladium mesowire and nanoparticle detector,
palladium nanoclusters/nanotube/nanoparticles/nanowires,
metal oxide and catalytic bead hydrogen sensing technology,
an electrochemical sensor (liquid or solid electrolyte),
piezoelectric-based hydrogen sensing technology,
a surface acoustic Wave and Microresonance based sensor,
all types of sensors with nanotechnology approaches such as carbon nanotubes, nanoparticles, nanowires, nanowhiskers, metallic nanotubes, metal oxide nanostructures, nanoclusters,
an optical-fibre based sensor such as a plastic optical fibre coated with a polymer,
an infra-red spectroscopy-based sensor.

For example, a suitable hydrogen sensor may comprise a palladium resistor. This palladium resistor is formed from a film of palladium deposited between two metal contacts. The palladium film shows change in conductivity on exposure to hydrogen due to a phase transition in the palladium. Such a palladium resistor may be arranged as one of the one or more gas sensitive parts, and the detection module may be configured to measure an electrical property of the resistor, e.g. by sending a current through the resistor.

Alternatively, a hydrogen sensor may comprise palladium field effect transistors or capacitors, or a sensor may include a layer of palladium coated on an optically active material that transforms the hydrogen concentration into an optical signal.

According to a preferred embodiment, the pressure vessel system comprises at least one of the one or more detection modules connected to at least one of the one or more gas sensitive parts through any one of the following: an electrical wire, an optical wire; and/or wherein at least one of the one or more detection modules comprises a first portion in the pressure vessel and a second portion outside the pressure vessel, said first portion being configured to communicate wirelessly with a second portion.

At least one of the one or more detection modules may be connected to at least one of the one or more gas sensitive parts through two electrical wires. In the case of an optically active material the detection modules may be connected by optical fibres to the one or more gas sensitive parts. In yet another embodiment, the one or more detection modules may comprise a first portion in the pressure vessel and a second portion outside the pressure vessel, said first portion being configured to communicate wirelessly with a second portion, for example using an RFID. In such embodiments, there may be integrated a first portion of the detection module as an assembly of a sensor sensing the modification of a gas sensitive material and an RFID chip, in the pressure vessel, and the sensed signal may be communicated via the RFID chip to a second portion of the detection module outside the pressure vessel. In other words, the actual detection is performed inside the pressure vessel and then sent to the second portion of the detection module outside of the vessel.

In exemplary embodiments of the invention, a detection module of the one or more detection modules may be located entirely outside of the pressure vessel. However, as described above a detection module may also be integrated at least partially within the pressure vessel, wherein optionally a further portion of the detection module is located outside of the pressure vessel.

In some embodiments, the electrical or optical wires may pass through the boss adapter. Additionally or alternatively, the electrical or optical wires may pass through the boss. Additionally or alternatively, the electrical or optical wires may pass between the liner and the reinforcement material or between the boss and the reinforcement material.

In embodiments of the system, at least one of the one or more detection modules may be configured to determine whether or not there is a leakage based on the detected modification at least one of the one or more gas sensitive parts. The detection module may be further configured to generate a warning signal when it is determined that there is a leakage. The warning signal may be any one or more of the following: a driver notice in the event that the pressure vessel is included in a car, an activation signal for a Malfunction Indicator Light (MIL), an evacuation request signal, a buzzer signal, etc. Also other actions can be taken such as the start of an emergency release if the vehicle is parked outside, etc. The detection module may be further configured to communicate information about a detected leak to an external device, e.g. to a refuelling station, such that a next refuelling may be prevented or prohibited for safety and environmental reasons. Such a communication may also include the precise location of the leak in the event that multiple gas sensitive parts are provided.

In some embodiments, at least one of the one or more detection modules may be configured to take into account the ambient temperature and/or the atmospheric pressure for improving the detection accuracy and for determining whether or not there is a leakage at a reduced leakage flowrate.

In some embodiments, a cavity may be provided around one or more of the gas sensitive parts, where any gas that escapes from the pressure vessel can accumulate in this cavity.

According to another aspect, there is provided a vehicle system comprising a pressure vessel system of any one of the previous embodiments. The pressure vehicle system may further comprise a connection assembly integrating one or more gas sensitive parts. More in particular, the connection assembly may comprise a first connection part and a second connection part. The first and second connection parts are configured to realize a gas tight connection. The one or more gas sensitive parts are arranged at a connection interface between the first connection part and the second connection part, wherein the one or more gas sensitive parts are configured to undergo a modification when a gas passes along the connection interface. The one or more detection modules of the pressure vessel system may then be further configured to detect a modification of the one or more gas sensitive parts at the connection interface. Typically the first connection part is connected with the interior of the pressure vessel via one or more valves and/or pipes. The skilled person understands that one ore more gas sensitive parts may be implemented at all connection points presenting a leakage risk along a hydrogen gas path from a pressure vessel up to a fuel cell or even inside the fuel cell, along a compressed natural gas path from a pressure vessel to an internal combustion engine, or along a liquefied petrol gas path from a pressure vessel to an internal combustion engine. A connection point comprises a connector assembly, e.g. a quick connector or fitting, with a connection interface. Along the potential leak path of this connection surface one or more gas sensitive parts may be included. Also in such embodiments, the detection module may be further configured to communicate information about a detected leak to an external device, e.g. to a refuelling station, such that a next refuelling may be prevented or prohibited for safety and environmental reasons. Such a communication may also include the precise location in the vehicle system of the leak.

According to a preferred embodiment, the vehicle system comprises a pressure vessel system according to any one of the previous embodiment and a connection assembly, said connection assembly comprising:

a first connection part and a second connection part, said first and second connection part being configured to be realize a gas tight connection;

one or more gas sensitive parts arranged at a connection interface between the first connection part and the second connection part, wherein the one or more gas sensitive parts are configured to undergo a modification when a gas passes along the connection interface; and wherein the one or more detection modules of the pressure vessel system are further configured to detect a modification of the one or more gas sensitive parts at the connection interface;

wherein said first connection part is connected with the interior of the pressure vessel via one or more valves and/or pipes.

According to yet another aspect of the invention, there is provided a connection assembly, said connection assembly comprising:

a first connection part and a second connection part, said first and second connection part being configured to realize a gas tight connection;

one or more gas sensitive parts arranged at a connection interface between the first connection part and the second connection part, wherein the one or more gas sensitive parts are configured to undergo a modification when a gas passes along the connection interface; and one or more detection modules configured to detect a modification of the one or more gas sensitive parts. The or each gas sensitive part is attached to the connection interface.

According to an embodiment, the connection assembly further comprises a seal arranged between the first connection part and the second connection part.

Preferably, the connection assembly comprises at least one of the one or more gas sensitive parts provided downstream of the seal.

According to an embodiment, the connection assembly comprises at least one of the one or more gas sensitive parts arranged on the seal.

According to an embodiment, the connection assembly according to the invention is configured to be gastight for a gas at a pressure above 3 bar.

According to an embodiment the connection assembly comprises at least one of the one or more gas sensitive parts comprises any one of the following:
  carbon nanotubes,
  carbon black,
  a polymeric material containing carbon nanotubes or carbon black,
  a nanotube gel,
  a super-absorbent gel,
  a polymerized gel with ionic liquid as solvent,
  a catalytic bead "pellistor",
  one or more metals selected from rhodium, palladium, platinum, uranium, lanthanide, and the rare earth materials.

According to an embodiment, the connection assembly comprises at least one of the one or more detection modules configured to measure any one or more of the following: an electrical property, a thermal property, a chemical property, an optical property.

According to an embodiment, the connection assembly comprises at least one of the one or more detection modules connected to at least one of the one or more gas sensitive parts through any one of the following: an electrical wire, an optical wire; and/or wherein at least one of the one or more detection modules comprises a first portion in the pressure vessel and a second portion outside the pressure vessel, said first portion being configured to communicate wirelessly with a second portion.

According to an embodiment, the connection assembly comprises at least one of the one or more detection modules configured to determine whether or not there is a leakage based on the detected modification of at least one of the one or more gas sensitive parts.

According to an embodiment, the connection assembly comprises at least one of the one or more detection modules configured to take into account the ambient temperature and/or the atmospheric pressure for determining whether or not there is a leakage.

According to yet another aspect of the invention there is provided a vehicle system comprising a connection assembly according to any one of the previous embodiments.

The invention also related to the use of a connection assembly according to any one of the previous embodiments in a vehicle system.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
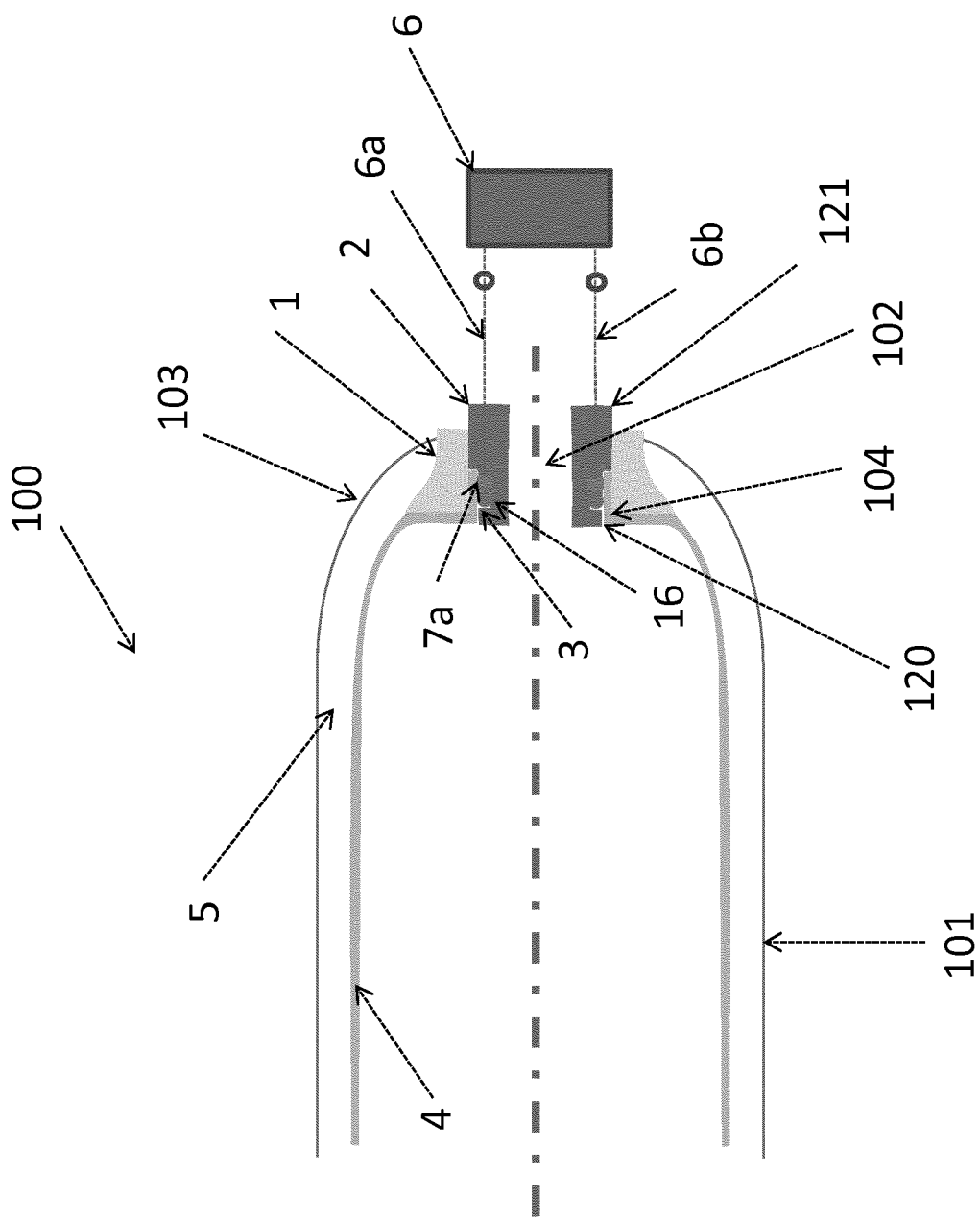
FIG. 1 illustrates schematically a cross section through a first embodiment of a pressure vessel system according to the present invention.

FIG. 1 illustrates a first exemplary embodiment of pressure vessel system 100. This pressure vessel system 100 comprises a pressure vessel 101 (only part of which is shown in the figure) configured to store gas under pressure. The pressure vessel 101 of FIG. 1 is formed by a liner 4 surrounded by a composite reinforcement material 5. In the system shown in FIG. 1, the liner 4 and the reinforcement material 5 of the pressure vessel 101 form a vessel with an elongated cylindrical shape and a rounded end 103.

In the system 100 of FIG. 1 there is an opening 102 in the rounded end part 103 of the pressure vessel 101. Opening 102 is delimited by an edge in the form of a cylindrical wall part 104. A boss 1 is provided around this cylindrical wall part 104, and a boss adaptor 2 is positioned within the cylindrical wall part 104. The boss adaptor 2 together with any components mounted in the boss adapter, such as a valve, e.g. a pressure relief valve or a multifunctional valve, an outlet, a sensor, a thermal pressure relief valve, a pressure sensor, a temperature sensor, an over-pressure relief valve, an adaptor part, a fitting part, etc., form a functional part mounted in sealing manner in opening 102. It is noted that, in an alternative embodiment, boss adaptor 2 may also be a closed part, i.e. a part not having a central passage. The opening 102 is delimited by the cylindrical wall part 104 and by an inner surface delimiting a passage in the boss 1.

In the system shown in FIG. 1, the boss adapter 2 comprises a first substantially cylindrical portion 120 having a first diameter, and a second substantially cylindrical portion 121 having a second diameter for example larger than the first diameter, said first portion 120 being inserted in the opening 102 and said second portion 121 extending outwardly out of the opening 102.

The liner 4 of the pressure vessel 101 shown in FIG. 1 has an integrated cylindrical wall part 104 delimiting opening 102 in the rounded end 103 of the vessel. This cylindrical wall part 104 is formed by an outwardly protruding portion of the liner 4. However, as the liner 4 is often not made of a material strong enough to hold the functional part (for example, a functional part comprising a boss adaptor 2) within the opening 102, the vessel 101 is typically provided with a boss 1 around the cylindrical wall part 104. This boss 1 may be formed from metal or any other material resisting to the pressure in the pressure vessel. The reinforced composite wall part 5 may be arranged around the boss 1. In other words, during manufacturing first the boss 1 may be arranged around the cylindrical wall part 104 of liner 4, whereupon reinforcing material may be arranged over the liner 4 and over a circumferential outer surface of the boss 1.

In embodiments of the pressure valve system 100 in which the liner 4 comprises an outwardly extending cylindrical wall part 104 delimiting an opening 102 and a boss 1, the boss 1 may be arranged around the cylindrical wall part 104, said boss 1 being at least partially covered by the reinforcement layer 5.

As can be seen from FIG. 1, there is also a spherical seal 3 arranged within the opening 102, between the cylindrical wall part 104 and the boss adaptor 2. This spherical seal 3 is designed to provide a seal between cylindrical wall part 104 and the boss adaptor 2 in order to prevent the stored gas from escaping from the pressure vessel. In some embodiments, the boss adaptor 2 may be provided with a circular groove 16 in which the seal 3 can be arranged.

However, in some circumstances (for example, because of damage to the seal 3, wear of the seal 3, or deterioration in the quality of the seal material), the seal 3 may no longer form an air-tight blockage between the cylindrical wall part 104 and the boss adaptor 2 and some of the gas stored within the pressure vessel 101 may escape.

The liner 4 may be manufactured from a thermoplastic material by blow moulding or injection moulding. The liner 4 can be composed of a mono-material based on HDPE, PA, PPA, . . . or can be made out of a coextruded structure including a layer with very low hydrogen permeability. The reinforcing layer 5 may be made from a composite material and may comprise reinforcement fibres, e.g. carbon, glass, aramid, etc., embedded in a thermoset or thermoplastic matrix. In yet another embodiment, the pressure vessel does not include a liner and the gas containment function is directly managed by the composite structure. However, also in the latter configuration a seal will be included in the assembly. The composite structure may be obtained by a filament winding process, a braiding process, an automatic tape placement process, a laser assisted tape placement process or any alternative process.

In embodiments comprising both a boss 1 and a boss adapter 2, the boss adapter 2 may be configured to screw into the boss 1.

The pressure vessel system comprises a sensitive part 7a configured to undergo a modification when the gas stored within the pressure vessel 101 passes along the potential leakage interface. The gas sensitive part 7a is provided downstream of the seal 3, between the functional part and the perimeter of the opening 102 of the vessel 101. More in particular, the gas sensitive part 7a is located between the boss adapter 2 and the edges of the opening 102 in the pressure vessel 1. In the illustrated embodiment, the gas sensitive part 7a is located between the boss adapter 2 and the substantially cylindrical wall part 104 delimiting opening 102.

The first gas sensitive part 7a is provided between part of the liner 4 and the boss adaptor 2. In such embodiments, the gas sensitive part 7a may be arranged on the substantially cylindrical wall part 104 of the liner 4. For example, the gas sensitive part 7a may be coated or overmoulded onto the protruding part 104 of the liner 4. In some embodiments, this substantially cylindrical portion 104 may comprise a metal for reinforcement of the cylindrical portion. In another embodiment, the gas sensitive part 7a is provided on the boss adapter by assembly, laying, sticking or overmoulding using an injection moulding process.

The pressure vessel system further comprises a detection module 6 configured to detect a modification of the gas sensitive part 7a. The detection module 6 or a controller connected to the detection module may be further configured to provide a warning signal when a modification of the gas sensitive part 7a is detected. Once the leak occurs, the gas sensitive part will be subject to a change of a physical characteristic of this gas sensitive part 7a and by this make it possible to detect the leak by means of an adapted detection module, typically an electronic module. Once the leak is detected, different warnings can be generated, e.g. a driver notice in the event that the pressure vessel is included in a vehicle, a Malfunction Indicator Light (MIL), an evacuation request, a buzzer, etc. Also other actions can be taken such as the start of an emergency release if the vehicle is parked outside, etc.

Some of the features described above in connection with FIG. 1 are also present in the exemplary embodiments of FIGS. 2-8, and will not be described again.

Figure 2:
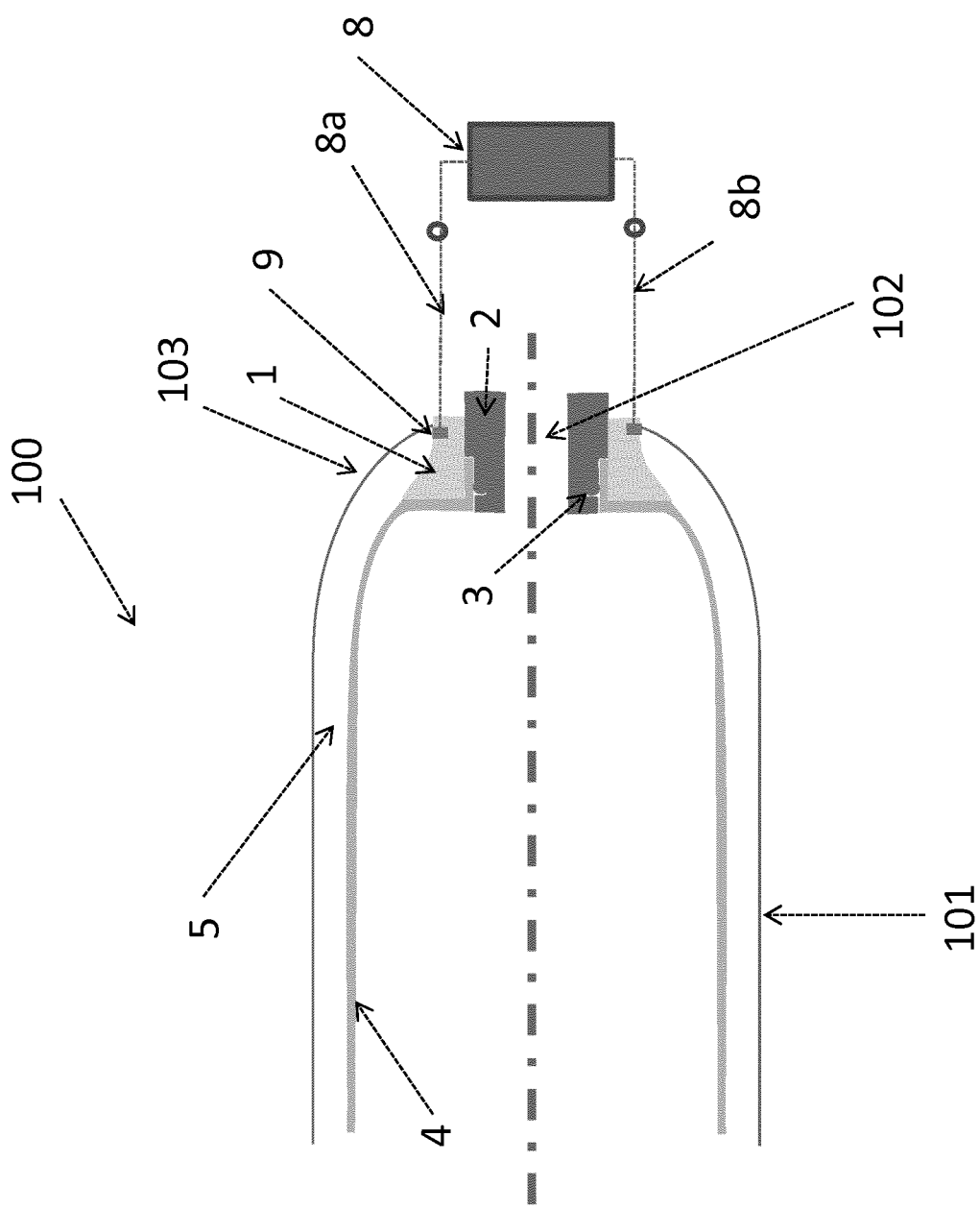
FIG. 2 illustrates schematically a cross section through a second embodiment of a pressure vessel system according to the present invention.

In the exemplary embodiment of FIG. 2, a further gas sensitive part 9 is shown between the outside edge of the boss 1 and the composite reinforcement material 5. If the liner 4 is damaged in an area within the pressure vessel 101, it is thought that the stored gas may escape from the liner 4 and move along the interface between the liner 4 and the reinforcement material 5, before then passing between the reinforcement material 5 and the boss 1. The gas sensitive part 9 is positioned in this second position to detect such gas leakages. The skilled person understands that the gas sensitive part 9 may also be provided at a different location or at a plurality of locations along this interface between the liner 4/the boss adaptor 2, on the one hand, and the reinforcement material 5 on the other hand. The pressure vessel system further comprises a detection module 8 configured to detect a modification of the gas sensitive part 9.

Figure 3:
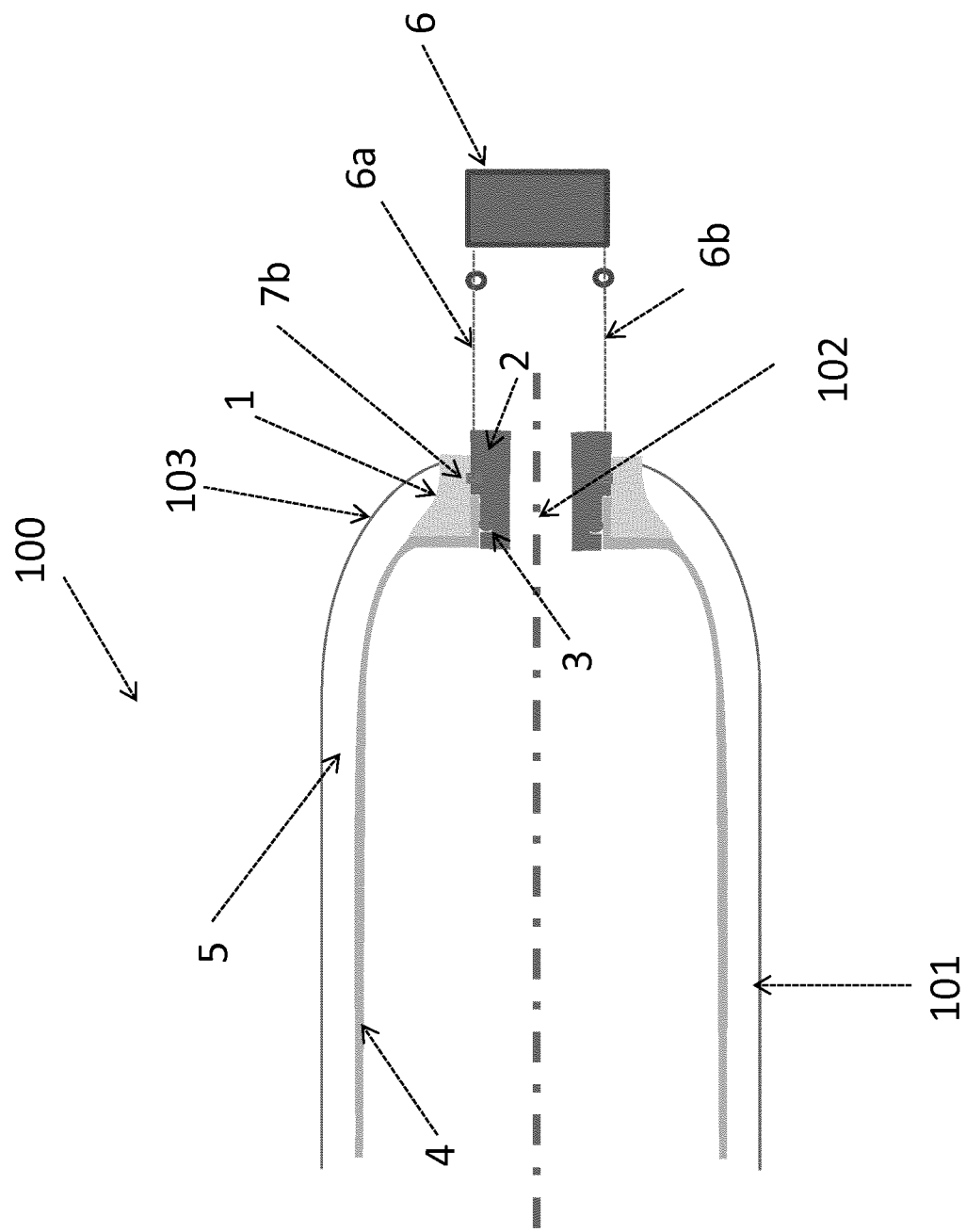
FIG. 3 illustrates schematically a cross section through a third embodiment of a pressure vessel system according to the present invention.

In the exemplary embodiment of FIG. 3, a gas sensitive part 7b is located between an inner surface delimiting a passage in the boss 1 and an outer surface of the boss adaptor 2. The pressure vessel system further comprises a detection module 6 configured and connected to detect a modification of the gas sensitive part 7b.

Figure 4:
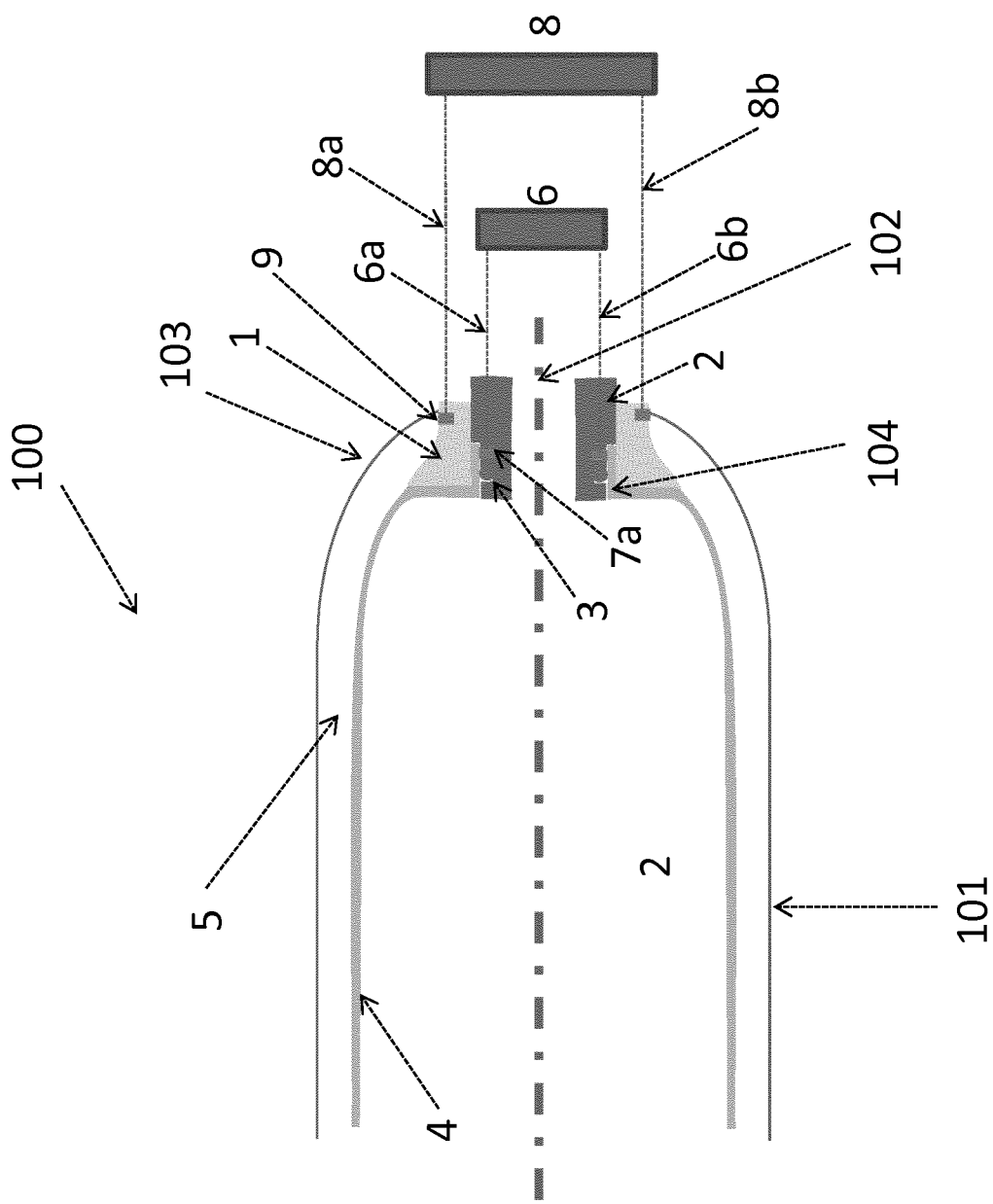
FIG. 4 illustrates schematically a cross section through a fourth embodiment of a pressure vessel system according to the present invention.

In the exemplary embodiment of FIG. 4, a gas sensitive part 7a is located between a wall portion 104 of the liner and an outer surface of the boss adaptor 2. The pressure vessel system comprises a detection module 6 configured and connected to detect a modification of the gas sensitive part 7a. Also, a further gas sensitive part 9 is shown between the outside edge of the boss 1 and the composite reinforcement material 5. The pressure vessel system further comprises a detection module 8 configured to detect a modification of the gas sensitive part 9.

Figure 5:
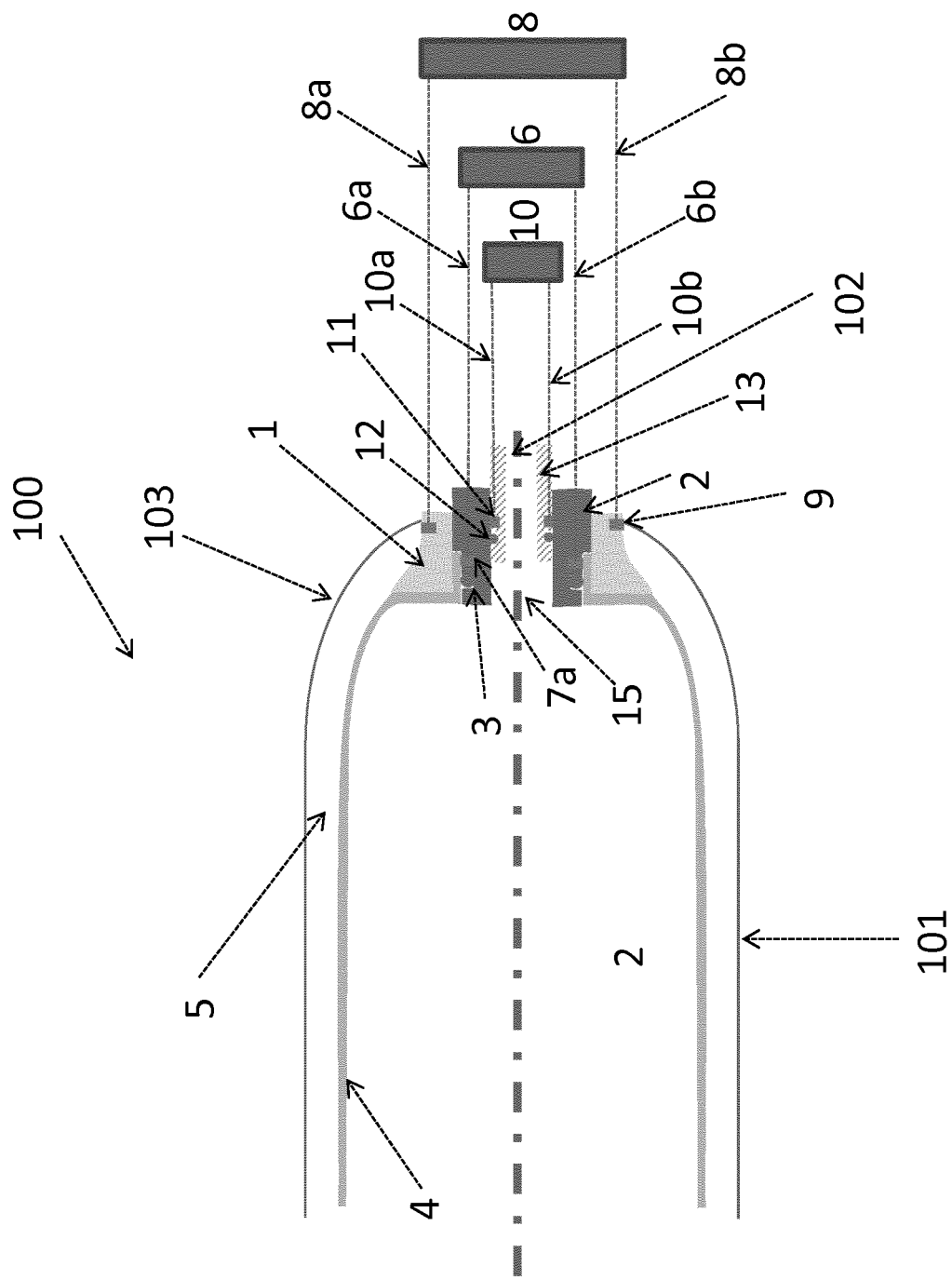
FIG. 5 illustrates schematically a cross section through a fifth embodiment of a pressure vessel system according to the present invention.

In the exemplary embodiment of FIG. 5, the functional part comprises a valve 13 arranged in a substantially cylindrical passage 15 in the boss adaptor 2. More in particular, the system further comprises a multifunction valve part 13 within the boss adaptor 2. In this embodiment, a further seal 12 is provided between the boss adaptor 2 and the multifunction valve part 13. As with the first seal 3 between the liner 4 and the boss adaptor 2, this second seal 12 is designed to prevent gas from escaping from the pressure vessel 101 via a path between the boss adaptor 2 and the multifunction value part 13. However, in case gas should still manage to escape through this potential leakage interface, the embodiment of FIG. 5 is provided with a third gas sensitive part 11, between the boss adaptor 2 and the multifunction valve part 13. The third gas sensitive part 11 is located downstream of the second seal 12. The pressure vessel system further comprises a detection module 10 configured to detect a modification of the gas sensitive part 11. In an alternative embodiment not represented here, the detection modules 6, 8 and 10 can be combined into one single detection module connected to all gas sensitive parts 7a, 9, 11.

In the embodiments of the pressure vessel system 100 shown in FIGS. 1 to 5, the opening 102 in the pressure vessel 101 is delimited by a outwardly protruding substantially cylindrical wall part 104 of the liner 4 and the functional part comprises a corresponding substantially cylindrical portion (in these embodiments, the boss adaptor 2) inserted in the opening 102. In embodiments where the substantially cylindrical wall part 104 protrudes outwardly, a boss 1 may be arranged around the substantially cylindrical wall part 104 delimiting the opening 102.

Figure 6:
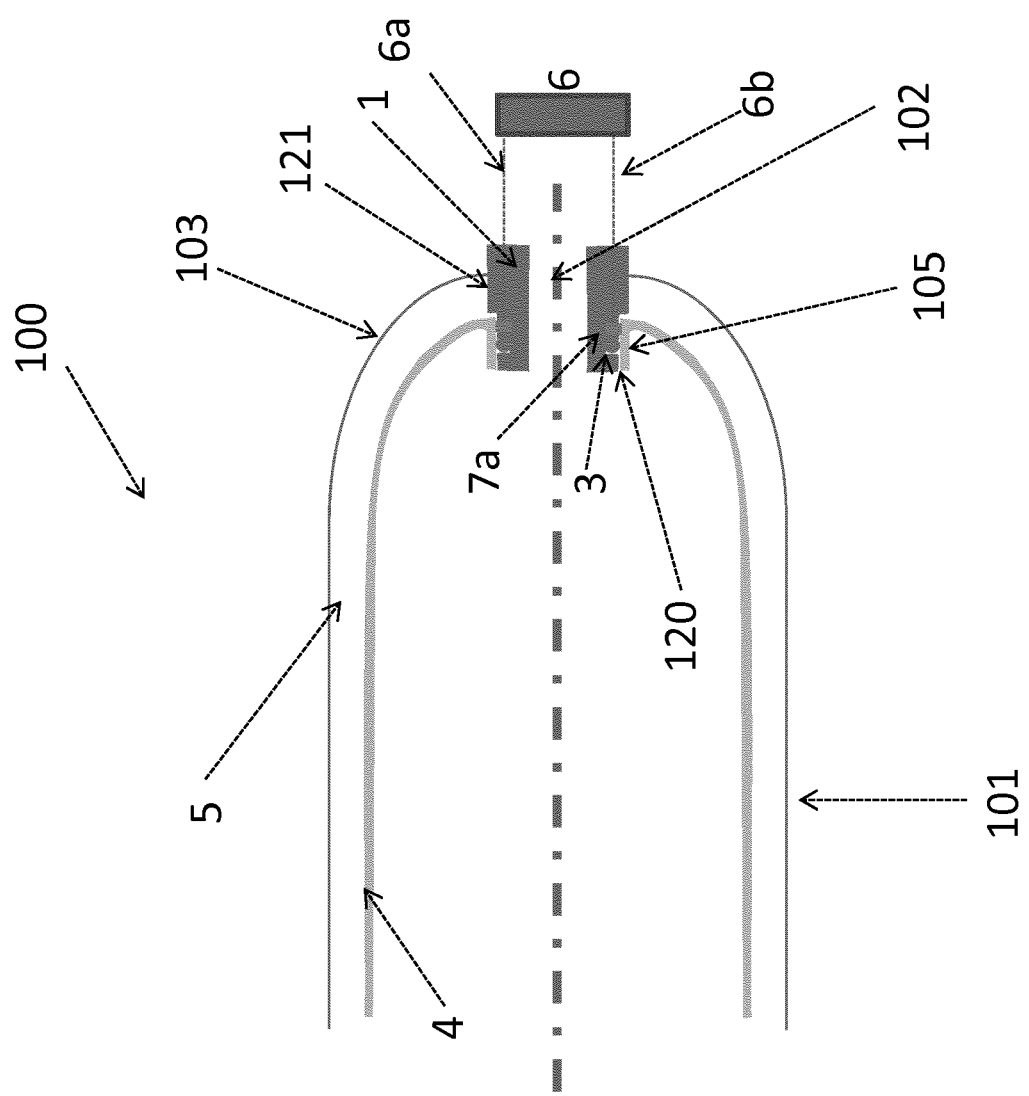
FIG. 6 illustrates schematically a cross section through a sixth embodiment of a pressure vessel system according to the present invention.

In contrast, in FIG. 6, the opening 102 is defined by an inwardly protruding part 105 of the liner 4 (i.e. a substantially cylindrical wall part 105 protruding inwardly towards the interior of the pressure vessel 101). The functional part, which is partially formed by the boss adaptor 2, is inserted within the wall part 105 of the liner 4. In this embodiment, the boss 1 comprises a first substantially cylindrical portion 120 having a first diameter, and a second substantially cylindrical portion 121 having a second diameter for example larger than the first diameter, said first portion 120 being inserted in the opening 102 and said second portion 121 extending outwardly out of the opening 102, wherein the reinforcement layer 5 covers at least partly the second substantially cylindrical portion 121. In the exemplary embodiment of FIG. 6, instead of a boss 1 and boss adaptor 2, there is provided one integrated boss 1 which extends in the opening 102 of the liner 4.

Figure 7:
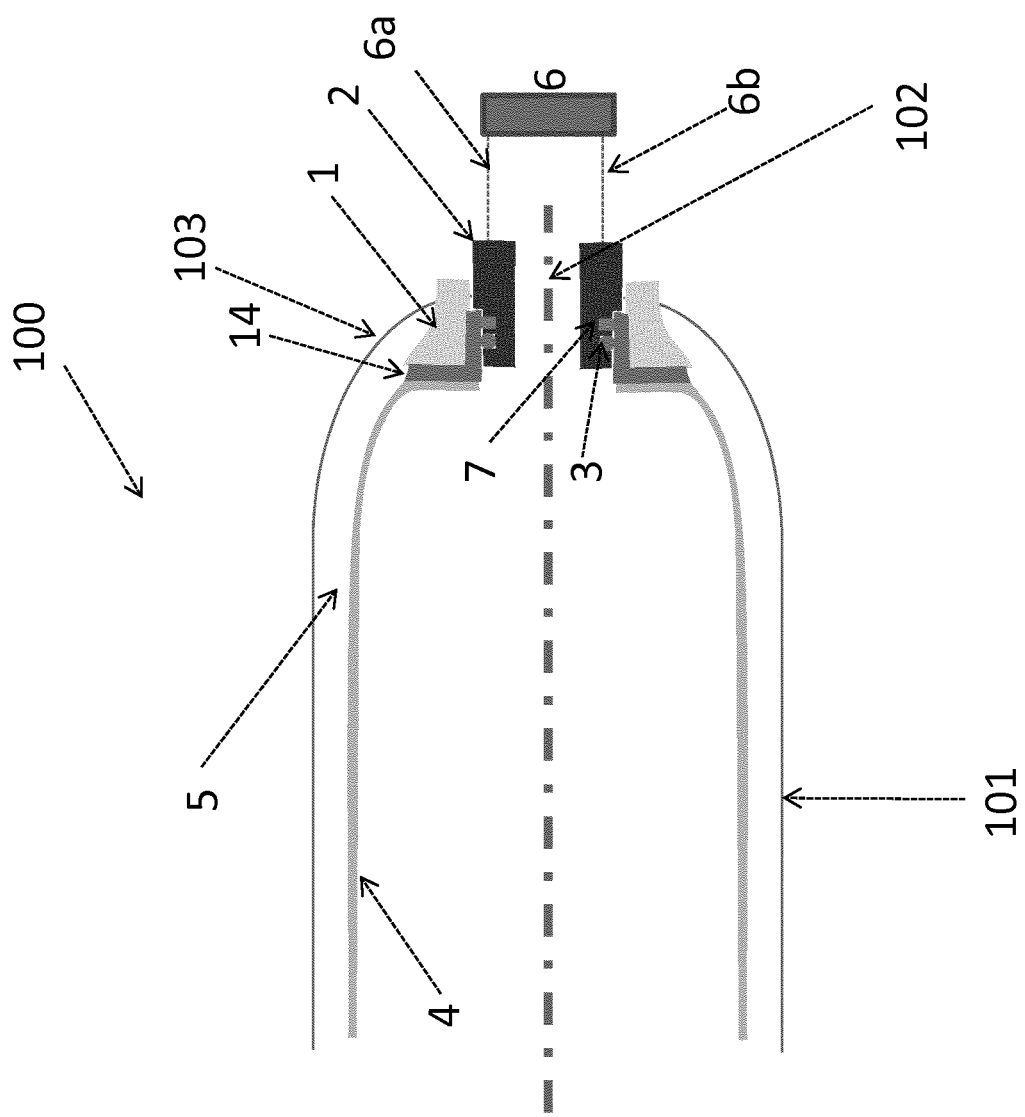
FIG. 7 illustrates schematically a cross section through an seventh embodiment of a pressure vessel system according to the present invention.

In the exemplary embodiment of FIG. 7, the liner 4 does not form a cylindrical opening. Instead, the cylindrical wall portion is formed by a separate cylindrical component 14 which may be overmoulded on the boss 1. This cylindrical component 14 may be formed from a weldable thermoplastic material. During the construction of the embodiment of FIG. 7, the cylindrical component 14 may be first be welded to the liner 4, and then the composite reinforcement material 5 may be applied.

Figure 8:
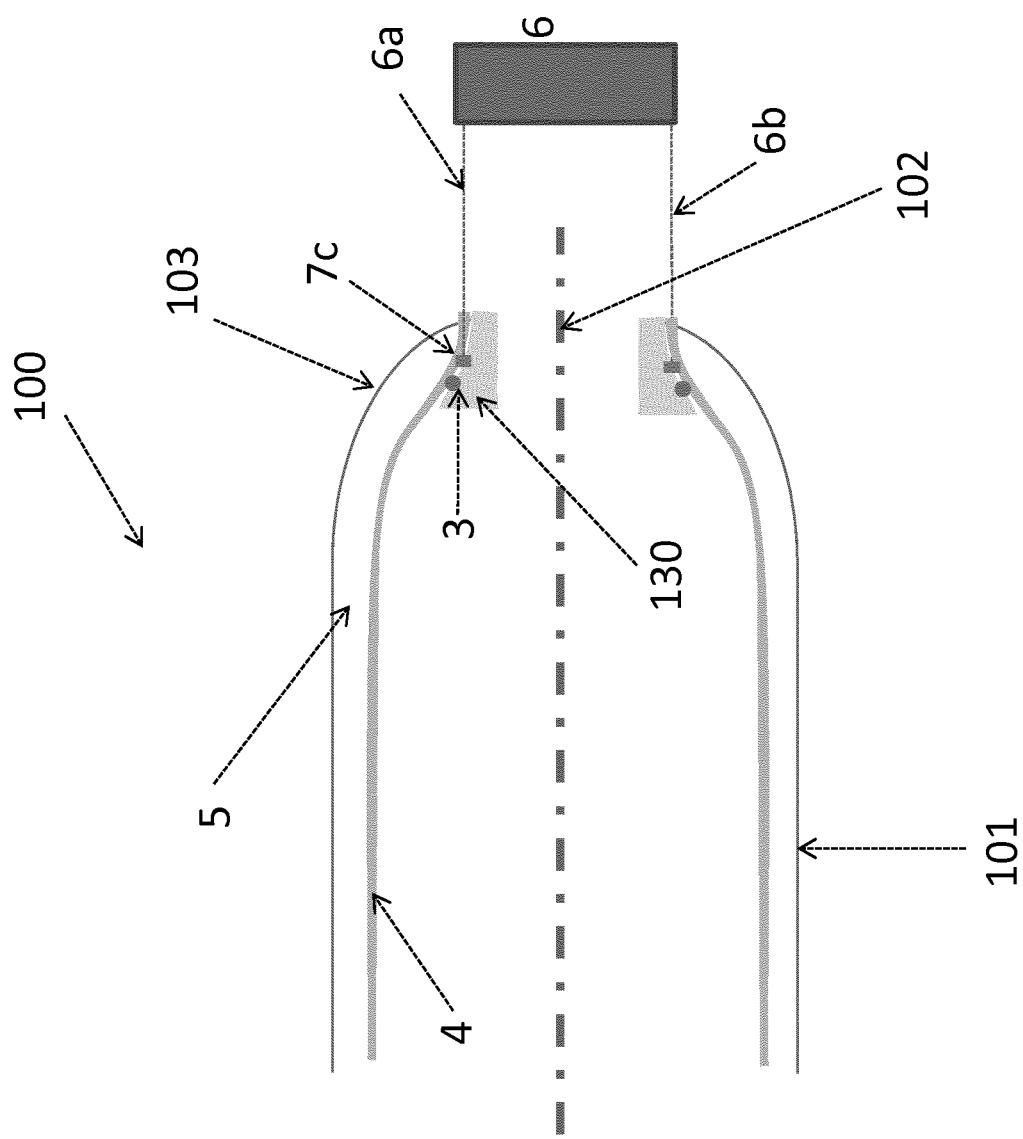
FIG. 8 illustrates schematically a cross section through an eighth embodiment of a pressure vessel system according to the present invention.

In the pressure vessel system 100 of FIG. 8, the system 100 is provided with an internal vessel adapter 130 inserted into the opening 102 in the pressure vessel 101. This internal vessel adapter 130 may be made of metal or any other material resisting to the pressure in the pressure vessel, and may be integrated during the blow moulding of the liner 4. In the embodiment of FIG. 8, the system 100 does not comprise a boss or a boss adaptor. A seal 3 is provided between an inner perimeter of the liner 4 and the internal vessel adapter 130 such that the opening 102 is suitable sealed. A gas sensitive part 7c is provided downstream of this seal 3, also between the liner 4 and the external walls of the internal vessel adapter 130. The pressure vessel system further comprises a detection module 6 configured to detect a modification of the gas sensitive part 7c.

In alternative embodiments not shown in the figures, it may also be possible to have one or more gas sensitive parts between the liner 4 and the reinforced material 5.

In the illustrated embodiments of the invention, the pressure vessel 101 may be configured to store any one of the following: liquid petroleum gas (LPG), hydrogen, compressed natural gas (CNG), ammonia gas.

In the system 100 of FIGS. 1 to 8, the pressure vessel 101 may be configured to store a gas under a pressure above 0.3 MPa (3 bar) in some embodiments of the invention. If the pressure vessel 101 is configured to store liquid petroleum gas (LPG), then the pressure vessel 101 may be configured to store this liquid petroleum gas at a pressure of approximately 0.5 MPa to 1 MPa (5 to 10 bar).

For pressure vessels 101 configured to store hydrogen gas, the pressure vessel 101 may store this gas at a pressure of approximately 70 MPa (700 bar) or approximately 35 MPa (old standard 350 bar). Finally, if the pressure vessel 101 is storing compressed natural gas (CNG), the pressure vessel 101 may be configured to store the gas at approximately 20 MPa (200 bar). If the pressure vessel is for storing ammonia, typically aqua ammonia, the pressure vessel may be configured to store the ammonia at a pressure from 0.1 MPa to 2 MPa.

In the illustrated embodiments, the one or more gas sensitive parts 7a, 7b, 7c, 9, 11 may be formed from any one of the following:
  carbon nanotubes,
  carbon black,
  a polymeric material containing carbon nanotubes or carbon black,
  a nanotube gel (for example, a dispersion of carbon nanotubes in a tin oxide matrix prepared using the sol-gel process)
  a super-absorbent gel, a polymerized gel with ionic liquid as solvent (such as that described in the paper "Development of micro hydrogen gas sensor utilizing polymerized gel with ionic liquid as solvent" by T. Yamauchi et al published in ECS Transactions, 2012, vol. 50, N°12, pp 231-236),
a catalytic bead "pellistor",
one or more metal selected from rhodium, palladium, platinum, uranium, lanthanide, and the rare earth materials.

In the illustrated embodiments it may be preferable to form the one or more of the gas sensitive parts 7a, 7b, 7c, 9, 11 from palladium. For example, the palladium can be put as a coating on the surface of part of the liner 4 and/or the boss adaptor 2 and/or the boss 1.

In FIGS. 1 to 8, the detection modules 6, 8, 10 may be configured to measure any one or more of the following: an electrical property, a thermal property, a chemical property, an optical property.

In some embodiments, the combination of the one or more gas sensitive parts 7a, 7b, 7c, 9, 11 and the one or more detection modules 6, 8, 10 may comprise any one of the following:
a thermal conductivity detector,
a palladium Field effect sensor,
a palladium based resistor,
a palladium coated fibre optic sensor,
a palladium mesowire and nanoparticle detector,
a palladium nanoclusters/nanotube/nanoparticles/nanowires,
metal oxide and catalytic bead hydrogen sensing technology,
an electrochemical sensor (liquid or solid electrolyte),
piezoelectric-based hydrogen sensing technology,
a surface acoustic Wave and Microresonance based sensor,
all types of sensors with nanotechnology approaches such as carbon nanotubes, nanoparticles, nanowires, nanowhiskers, metallic nanotubes, metal oxide nanostructures, nanoclusters,
an optical-fibre based sensor or a plastic optical fibre coated with a polymer,
an infra-red spectroscopy-based sensor.

In the systems 100 shown in FIGS. 1 to 8, at least one of the one or more detection modules 6, 8, 10 may be connected to at least one of the one or more gas sensitive parts 7, 9, 11 through two electrical or optical wires 6a, 6b; 8a, 8b; 10a, 10b. In some embodiments, these electrical or optical wires 6a, 6b; 8a, 8b; 10a, 10b may pass through the boss adapter 102. Additionally or alternatively, the electrical or optical wires 6a, 6b; 8a, 8b; 10a, 10b may pass through the boss 1. Alternatively, the connection could be made by wireless technology for example RFID technology.

In embodiments of the system 100, one or more detection modules 6, 8, 10 may be configured to determine whether or not there is a leakage based on the detected modification of at least one gas sensitive part 7, 9, 11.

In embodiments of the illustrated systems 100 of the invention, at least one of the one or more detection modules may be configured to take into account the ambient temperature and/or the atmospheric pressure when determining whether or not there is a leakage from the pressure vessel 101.

A person of skill in the art would readily recognize that steps of determining whether or not there has been a leakage from the pressure vessel can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps involved in determining whether or not there has been a leakage.

Figure 9:
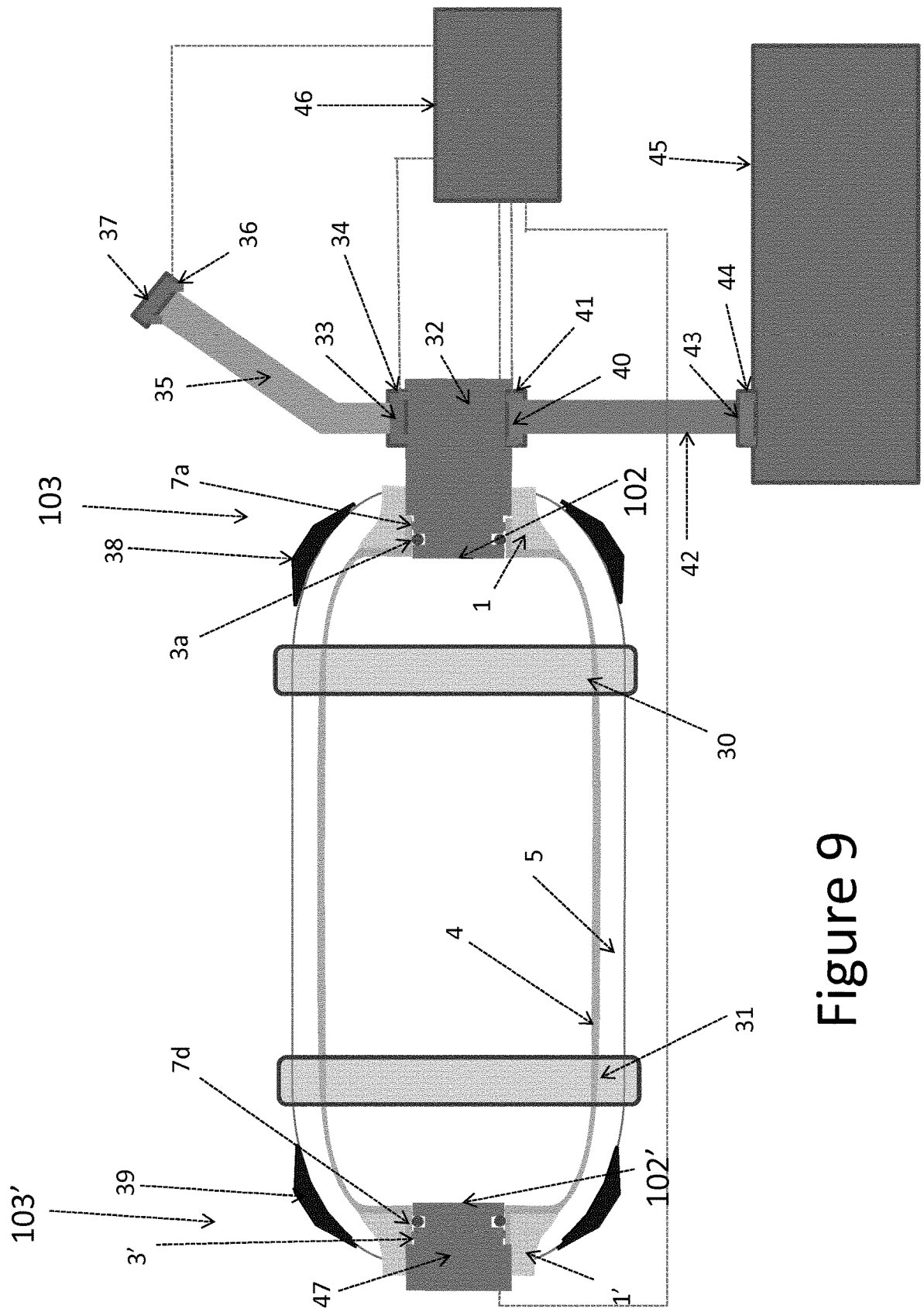
FIG. 9 illustrates schematically a fuel cell system comprising an exemplary embodiment of a pressure vessel and an exemplary embodiment of a connection assembly according to the invention.

FIG. 9 illustrates an exemplary embodiment of a fuel cell system comprising pressure vessel system 100 which is largely identical to the vessel of FIG. 1. This pressure vessel system 100 comprises a pressure vessel 101 configured to store gas under pressure. The pressure vessel 101 is formed by a liner 4 surrounded by a composite reinforcement material 5. The pressure vessel 101 has an elongated cylindrical shape with a first rounded end 103 and a second rounded end 103'. The pressure vessel 101 may be provided with shock absorbers 38, 39 at the rounded ends 103, 103'. Further, there may be provided straps 30, 31 around the cylindrical part of the pressure vessel 101 for fixing the pressure vessel system 100 to the vehicle.

In the pressure vessel system 100 of FIG. 9 there is a first opening 102 in the first rounded end part 103 and a second opening 102' in the second rounded end part 103'. In other embodiments, only one end part 103 may be provided with an opening. A first functional part 32 in the form of a multifunctional valve 32, e.g. a hydrogen multifunction valve, is arranged in the first opening 102. A second functional part 47, e.g. an auxiliary pressure relief valve, is arranged in the second opening 102'. A first seal 3 is arranged between an edge delimiting the first opening 102 and functional part 32. Similarly, a second seal 3' is arranged between an edge delimiting the second opening 102' and functional part 47.

In FIG. 9 the structure of the pressure vessel 101 and of the mounting of functional part 32 is illustrated to be the same as in the embodiment of FIG. 1, i.e. using a boss 1, 1' provided around a cylindrical wall part protruding outwardly of the liner 4 and delimiting opening 102, 102'. However, a skilled person understands that the structure of any one of the FIGS. 6-8 is also possible.

The pressure vessel system 100 comprises a first sensitive part 7a and a second sensitive part 7d configured to undergo a modification when the gas stored within the pressure vessel 101 passes along the potential leakage interface. The gas sensitive part 7a is provided downstream of the seal 3, between the functional part 32 and the perimeter of the first opening 102 of the vessel 101. The gas sensitive part 7d is provided downstream of the seal 3', between the functional part 47 and the perimeter of the second opening 102' of the vessel 101. For example, the gas sensitive part 7a, 7d may be attached to the protruding part of the liner 4 or to a side of the seal 3, 3', or to the functional part 32, e.g. by coating, overmoulding, laying, sticking, welding, chemical attaching, etc. Also, it may be integrated in the protruding part of the liner 4, in a side of the seal 3, 3', or in the functional part 32.

In order to further limit the components, the seal and the gas sensitive part could be combined into one single component. When attached to or integrated in a seal, the gas sensitive part may be positioned on the side of the seal such that in normal operating conditions (without a leak) the gas sensitive material is not in contact with the gas inside the pressure vessel.

The fuel cell system of FIG. 9 further comprises a refuelling interface 37 connected to the multifunctional valve 32 through a refuelling pipe 35, and fuel cell 45 connected to the multifunctional valve 32 through a fuel cell feeding pipe 42. In such a system four connection interfaces can be distinguished: a connection interface between refuelling interface 37 and refuelling pipe 35, a connection interface between refuelling pipe 35 and multifunctional valve 32, a connection interface between multifunctional valve 32 and fuel cell feeding pipe 42, and a connection interface between fuel cell feeding pipe 42 and fuel cell 45. One or more gas sensitive parts may be arranged at each of those connection interfaces, see reference numerals 34, 36, 41, 44.

The pressure vessel system further comprises an electronic control unit 46 functioning as a detection module configured to detect a modification of one or more of the gas sensitive parts 7a, 7d, 34, 41, 36, 44. The electronic control unit 46 may be further configured to provide a warning signal when a modification of one of the gas sensitive parts 7a, 7d, 34, 41, 36, 44 is detected. The presence of the leak can hereby be located precisely, and indications can be given to a driver or a repair shop on the scope of the reparation. When a leak is detected, this can be communicated e.g. to the refuelling station and a next refuelling may be prevented or prohibited for safety and environmental reasons. This communication may also include the precise location of the leak.

A similar concept may be applied in a fuel cell system at one or more connection parts inside the fuel cell system (not illustrated in the figures). This would allow a further discrimination of the leak location.

More generally, the skilled person understands that one ore more gas sensitive parts may be implemented at all connection points presenting a leakage risk along a hydrogen gas path from a pressure vessel up to a fuel cell, along a compressed natural gas path from a pressure vessel to an internal combustion engine, or along a liquefied petrol gas path from a pressure vessel to an internal combustion engine. These connection points can comprise one or more quick connectors, one or more fittings for instance of the type "Swagelock". Such a fitting may have an integrated sealing surface, with or without a seal. Along the potential leak path of this sealing surface one or more gas sensitive parts may be included. Ideally, a gas sensitive part should be positioned close to the sealing surface and integrated inside the connection assembly.

Whilst the principles of the invention have been set out above in connection with specific embodiments, it is to be understood that this description is merely made by way of example and not as a limitation of the scope of protection which is determined by the appended claims.

The invention claimed is:

1. A pressure vessel system comprising:
a pressure vessel for storing a gas under pressure,
when there is a leakage at a leakage interface of the pressure vessel, one or more gas sensitive parts configured to undergo a modification when the gas passes along the leakage interface; said leakage interface being an interface within the pressure vessel; and
one or more detection modules configured to detect a modification of the one or more gas sensitive parts,
wherein at least one of the one or more gas sensitive parts comprises any one of the following:
carbon nanotubes,
carbon black,
a polymeric material containing carbon nanotubes or carbon black,
a nanotube gel,
a super-absorbent gel,
a polymerized gel with ionic liquid as solvent,
a catalytic bead (pellistor),
one or more metals selected from rhodium, palladium, platinum, uranium, lanthanide, and the rare earth materials.

2. The pressure vessel system of claim 1, wherein the leakage interface is any one of the following: an interface between two layers of a pressure vessel body of the pressure vessel which are in contact with each other, a connection interface between two integrated parts of the pressure vessel, a connection interface between an integrated part of the pressure vessel and a layer of the pressure vessel body.

3. The pressure vessel system of claim 1, wherein the pressure vessel comprises a pressure vessel body and a functional part which is provided in an opening of the pressure vessel body, wherein a seal is arranged between an edge of the opening and the functional part, and wherein at least one of the one or more gas sensitive parts is provided downstream of the seal, with reference to a flow of gas through the opening.

4. The pressure vessel system of claim 3, wherein the pressure vessel body is an elongate substantially cylindrical body with two rounded end parts, and wherein the functional part is arranged in an opening in one of the end parts.

5. The pressure vessel system of claim 3, wherein the opening is delimited by a substantially cylindrical wall part of the pressure vessel; and wherein the functional part comprises a corresponding substantially cylindrical portion inserted in the opening;
wherein at least one of the one or more gas sensitive parts is arranged at the interface between the substantially cylindrical portion of the functional part and an inner side of the substantially cylindrical wall part.

6. The pressure vessel system of claim 3, wherein the opening is delimited by a
substantially cylindrical wall part of the pressure vessel which protrudes outwardly, wherein a boss is arranged around the substantially cylindrical wall part delimiting the opening, and wherein at least one of the one or more gas sensitive parts is arranged at an interface of the boss.

7. The pressure vessel system of claim 3, wherein at least one of the one or more gas sensitive parts is attached to the seal or integrated in the seal.

8. The pressure vessel system of claim 1, wherein the pressure vessel is configured to store any one of the following: liquid petroleum gas (LPG), hydrogen, compressed natural gas (CNG) ammonia; and wherein the pressure vessel is configured to withstand a pressure above 2 bar.

9. The pressure vessel system of claim 1, wherein the pressure vessel comprises a liner and a reinforcement layer arranged around the liner.

10. The pressure vessel system of claim 9, wherein the liner comprises an outwardly extending cylindrical wall part delimiting an opening, wherein a boss is arranged around the cylindrical wall part, said boss being partially covered by the reinforcement layer, wherein at least one of the one or more gas sensitive parts is arranged between the boss and the reinforcement layer.

11. The pressure vessel system of claim 9, wherein the liner comprises a substantially cylindrical wall part protruding inwardly towards the interior of the pressure vessel, wherein a boss adapter is arranged in the substantially cylindrical wall part, and the boss adapter comprises a first substantially cylindrical portion, and a second substantially cylindrical portion, said first portion being inserted in the opening and said second portion extending outwardly out of the opening; wherein the reinforcement layer covers at least partly the second substantially cylindrical portion; and wherein at least one of the one or more gas sensitive parts is arranged between the second substantially cylindrical portion and the reinforcement layer.

12. The pressure vessel system of claim 1, wherein at least one of the one or more detection modules is connected to at least one of the one or more gas sensitive parts through any one of the following: an electrical wire, an optical wire; and/or wherein at least one of the one or more detection modules comprises a first portion in the pressure vessel and a second portion outside the pressure vessel, said first portion being configured to communicate wirelessly with a second portion.

13. A vehicle system comprising a pressure vessel system of claim 1 and a connection assembly comprising:
   a first connection part and a second connection part, said first and second connection part being configured to realize a gas tight connection;
   one or more gas sensitive parts arranged at a connection interface between the first connection part and the second connection part, wherein the one or more gas sensitive parts are configured to undergo a modification when a gas passes along the connection interface; and wherein the one or more detection modules of the pressure vessel system are further configured to detect a modification of the one or more gas sensitive parts at the connection interface;
   wherein said first connection part is connected with the interior of the pressure vessel via one or more valves and/or pipes.

14. A connection assembly comprising:
   a first connection part and a second connection part, said first and second connection part being configured to realize a gas tight connection;
   one or more gas sensitive parts arranged at a connection interface between the first connection part and the second connection part, wherein the one or more gas sensitive parts are configured to undergo a modification when a gas passes along the connection interface; and one or more detection modules configured to detect a modification of the one or more gas sensitive parts,
   wherein at least one of the one or more gas sensitive parts comprises any one of the following:
   carbon nanotubes,
   carbon black,
   a polymeric material containing carbon nanotubes or carbon black,
   a nanotube gel,
   a super-absorbent gel,
   a polymerized gel with ionic liquid as solvent,
   a catalytic bead (pellistor),
   one or more metals selected from rhodium, palladium, platinum, uranium, lanthanide, and the rare earth materials.

15. The pressure vessel system of claim 14, wherein the leakage interface is any one of the following: an interface between two layers of a pressure vessel body of the pressure vessel which are in contact with each other, a connection interface between two integrated parts of the pressure vessel, a connection interface between an integrated part of the pressure vessel and a layer of the pressure vessel body.

16. The pressure vessel system of claim 14, wherein the pressure vessel comprises a pressure vessel body and a functional part which is provided in an opening of the pressure vessel body, wherein a seal is arranged between an edge of the opening and the functional part, and wherein at least one of the one or more gas sensitive parts is provided downstream of the seal, with reference to a flow of gas through the opening.

17. The pressure vessel system of claim 16, wherein the pressure vessel body is an elongate substantially cylindrical body with two rounded end parts, and wherein the functional part is arranged in an opening in one of the end parts.

18. The pressure vessel system of claim 16, wherein the opening is delimited by a substantially cylindrical wall part of the pressure vessel; and wherein the functional part comprises a corresponding substantially cylindrical portion inserted in the opening;
   wherein at least one of the one or more gas sensitive parts is arranged at the interface between the substantially cylindrical portion of the functional part and an inner side of the substantially cylindrical wall part.

19. A pressure vessel system comprising:
   a pressure vessel for storing a gas under pressure,
   a pressure vessel body and an opening of the pressure vessel body, the opening being delimited by a substantially cylindrical wall part of the pressure vessel which protrudes outwardly,
   a boss arranged around the substantially cylindrical wall part delimiting the opening,
   one or more gas sensitive parts arranged at an interface of the boss, when there is a leakage at a leakage interface of the pressure vessel, the one or more gas sensitive parts are configured to undergo a modification when the gas passes along the interface; and
   one or more detection modules configured to detect a modification of the one or more gas sensitive parts.

20. The pressure vessel system of claim 19, wherein at least one of the one or more gas sensitive parts comprises any one of the following:
   carbon nanotubes,
   carbon black,
   a polymeric material containing carbon nanotubes or carbon black,
   a nanotube gel,
   a super-absorbent gel,
   a polymerized gel with ionic liquid as solvent,
   a catalytic bead (pellistor),
   one or more metals selected from rhodium, palladium, platinum, uranium, lanthanide, and the rare earth materials.

* * * * *